United States Patent [19]

Lee

[11] 4,383,797
[45] May 17, 1983

[54] UNDERWATER TURBINE DEVICE WITH HINGED COLLAPSIBLE BLADES

[76] Inventor: Edmund M. Lee, 142 Garrard Rd., Whitby, Ontario, Canada, L1N 3K6

[21] Appl. No.: 168,473

[22] Filed: Jul. 14, 1980

[30] Foreign Application Priority Data

Jul. 16, 1979 [CA] Canada .................................. 331850

[51] Int. Cl.³ ........................................... F03B 13/12
[52] U.S. Cl. ...................................... 415/7; 415/2 R
[58] Field of Search ................ 415/7; 416/119, 84–86, 416/98, 111, 140 R, 87, 88, 233

[56] References Cited

U.S. PATENT DOCUMENTS

| 836 | 3/1808 | Johnson | 416/119 |
|---|---|---|---|
| 3,804 | 10/1844 | Robinson | 416/119 |
| 4,843 | 11/1846 | Rowand | 415/2 R |
| 113,284 | 4/1871 | Folsom | 416/119 |
| 195,114 | 9/1877 | Folsom | 416/119 |
| 279,066 | 6/1883 | Witherspoon . | |
| 302,769 | 7/1884 | Pallausch | 416/111 |
| 423,935 | 3/1890 | Le Duc | 416/119 |
| 436,595 | 9/1890 | Collins | 416/119 |
| 774,592 | 11/1904 | Mathews | 416/86 |
| 885,141 | 4/1908 | Brown | 416/111 |
| 921,940 | 5/1909 | Atkinson | 416/119 |
| 973,869 | 10/1910 | Logan | 415/2 R |
| 1,109,839 | 9/1914 | Henry | 415/7 |
| 1,157,416 | 10/1915 | Olive | 416/119 |
| 1,265,114 | 5/1918 | Riddle | 416/119 X |
| 1,441,863 | 1/1923 | Luick | 416/111 X |
| 2,097,286 | 10/1937 | McGee | 416/86 X |
| 2,335,817 | 11/1943 | Topalov | 170/13 |
| 2,730,631 | 3/1953 | Dandini | 290/54 |
| 3,510,229 | 5/1970 | Smith | 416/119 |
| 3,604,942 | 9/1971 | Nelson . | |
| 3,978,345 | 8/1976 | Bailey | 416/87 X |
| 4,017,205 | 4/1977 | Bolie . | |
| 4,023,041 | 5/1977 | Chappell | 416/85 X |
| 4,276,481 | 6/1981 | Parker | 416/119 X |

FOREIGN PATENT DOCUMENTS

| 33793 | 10/1924 | Denmark | 416/111 |
|---|---|---|---|
| 524883 | 5/1931 | Fed. Rep. of Germany | 415/2 R |
| 2740722 | 3/1979 | Fed. Rep. of Germany | 416/84 |
| 344196 | 10/1904 | France | 416/119 |
| 22605 | 8/1921 | France | 415/7 |
| 245 | of 1874 | United Kingdom | 416/111 |
| 250243 | 8/1927 | United Kingdom | 416/111 |
| 304514 | 1/1929 | United Kingdom | 416/111 |

*Primary Examiner*—Everette A. Powell, Jr.
*Attorney, Agent, or Firm*—Parkhurst & Oliff

[57] ABSTRACT

A submersible turbine device which can be used in conjunction with a water wheel operated at water level, away from the submerged turbine device. The submersible turbine device comprises a turbine bed and a turbine wheel which comprises a central rotor and a plurality of turbine blades. A forward shield is positioned to permit current flow on the exposed turbine blades while shielding the opposite blades of the turbine wheel. The turbine blade comprises sections which are hinged in such a manner that they automatically extend when exposed to current flow for maximum drive and that they automatically fold for minimum resistance when travelling against water pressure. A supplementary turbine device comprises anchored, upwardly extending support means, a buoyant platform mounted to the anchored upwardly extending support means for floating at the water level, and a water wheel rotatably mounted in the buoyant platform. The upwardly extending support means is adapted to permit automatic vertical travel of the buoyant platform to adjust for changes in the water level and also to provide horizontal shifting of the water wheel to coordinate with the upwards and downwards movement of the buoyant platform.

8 Claims, 13 Drawing Figures

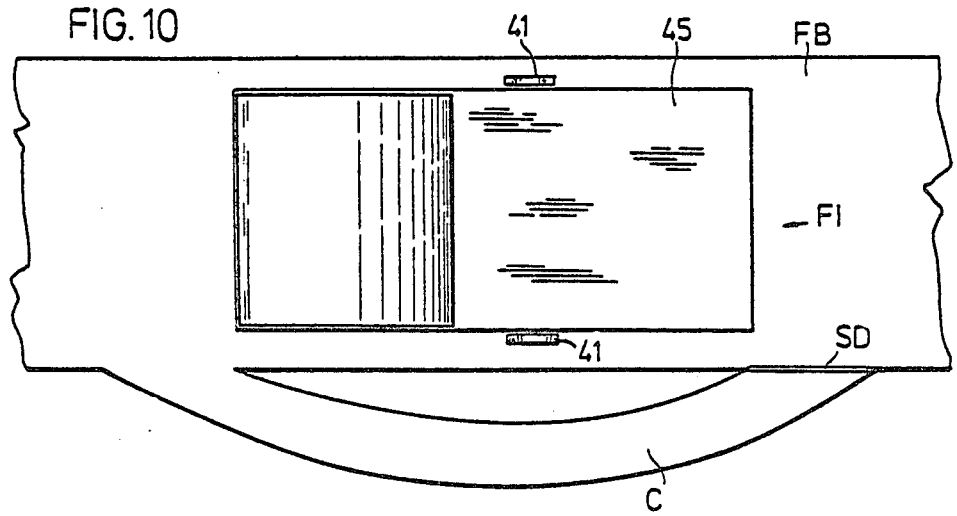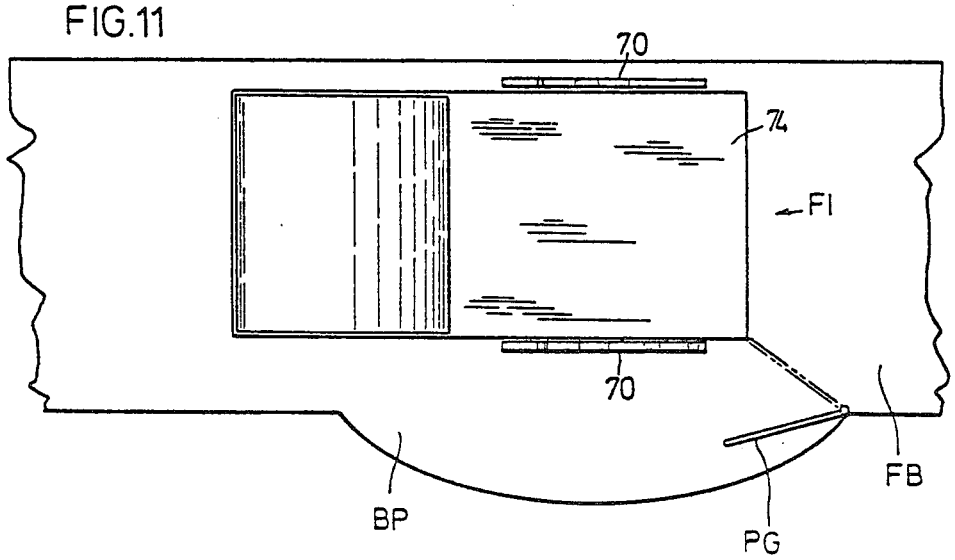

UNDERWATER TURBINE DEVICE WITH HINGED COLLAPSIBLE BLADES

FIELD OF THE INVENTION

The present invention relates to a submersible turbine device adapted to be driven by a low head current flow in a body of water and, more particularly, to a submersible turbine device having blades which automatically extend and fold to improve the efficiency of the turbine device. Said submersible turbine device may operate in co-ordination with a floating water wheel to provide for much greater efficiency to each other.

BACKGROUND OF THE INVENTION

A conventional turbine wheel comprises a rotary axle provided with a plurality of outwardly extending turbine blades. An arrangement is shown in U.S. Pat. No. 2,335,817 issued Nov. 30, 1943 to M. I. Topolav. In order to operate such an arrangement, one of the sets of blades, usually the upper set, is exposed to current flow and the lower set of blades is shielded from current flow to permit rotation of the wheel. However, even though the lower blades are shielded from direct current flow, they are required to move against the pressure of the water surrounding the turbine wheel such that there is a resistance to wheel rotation and a limitation on the efficiency of the turbine wheel. Therefore, by means of reducing the water resistance to the turbine wheel rotation, its efficiency will be proportionately increased.

Accordingly, the turbine device of the present invention has been designed to operate more efficiently than the prior art structures and, more specifically, has been provided with turbine blades adapted to provide a maximum driving force when exposed to current flow and to have minimal resistance to the pressure of water surrounding the wheel when in a current flow shielded position. As such, the turbine device of the present arrangement comprises a turbine bed and a turbine wheel mounted in fixed relation with respect to the turbine bed. The wheel includes a central axle and a plurality of turbine blades extending outwardly from the axle. The turbine bed is contoured to snugly accommodate and permit rotation of the turbine wheel and includes a forward shield positioned to permit current flow on the turbine blades which are in an exposed position for driving the turbine wheel and to prevent current flow on the turbine blades which are in the shielded position.

The turbine blades are made up of a plurality of sections, i.e., sections extending outwardly from the rotational axis of the turbine wheel. The sections in each blade are connected to one another by hinges. The interior section may either be fixedly or hingedly connected to the central axle. The arrangement is one in which the hinges are pressure actuated for automatic extension of the sections to the upward current flow exposed position to maximize the driving force on the wheel and pressure actuated for automatic collapse or folding of the sections when in the downward current flow shielded position to minimize resistance to wheel rotation.

This invention may also be used in conjunction with a floating water wheel, for example of the type shown in U.S. Pat. No. 2,097,286 to McGee.

BRIEF DESCRIPTION OF THE DRAWINGS

The above as well as other features of the present invention will become apparent from the following detailed description of the preferred embodiments according to this invention wherein.

Figure 6:
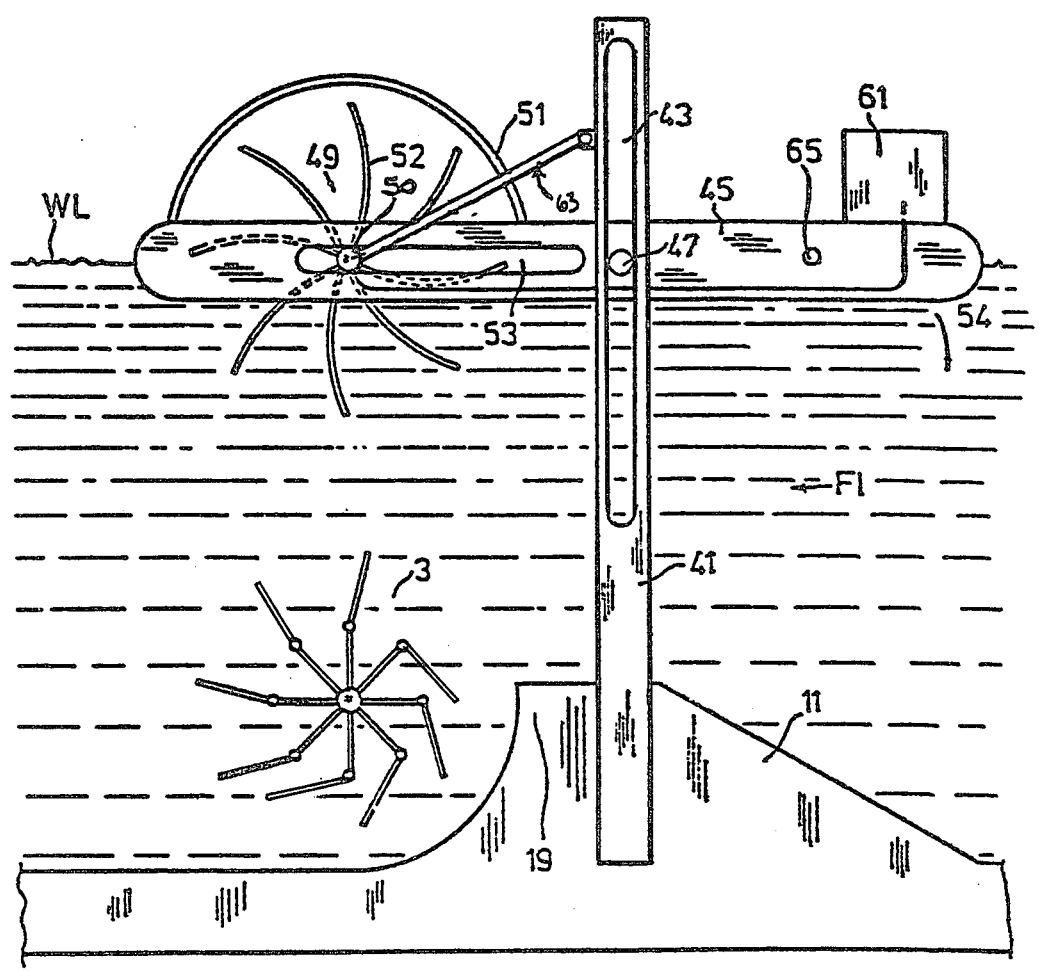
Figure 7:
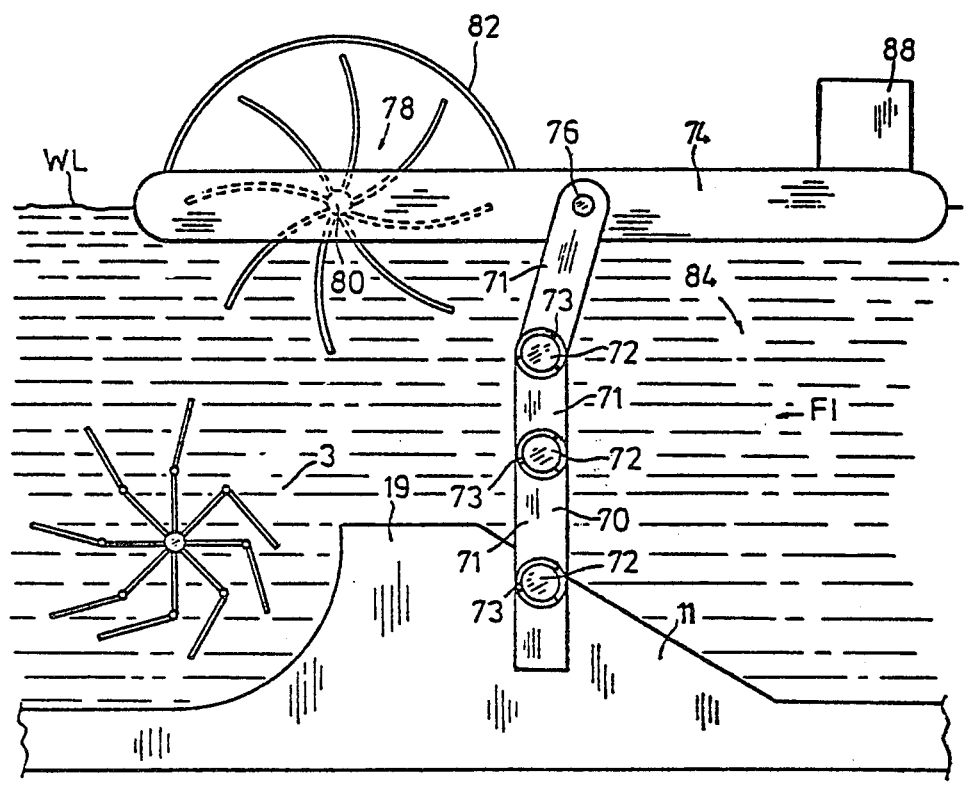
Figure 8:
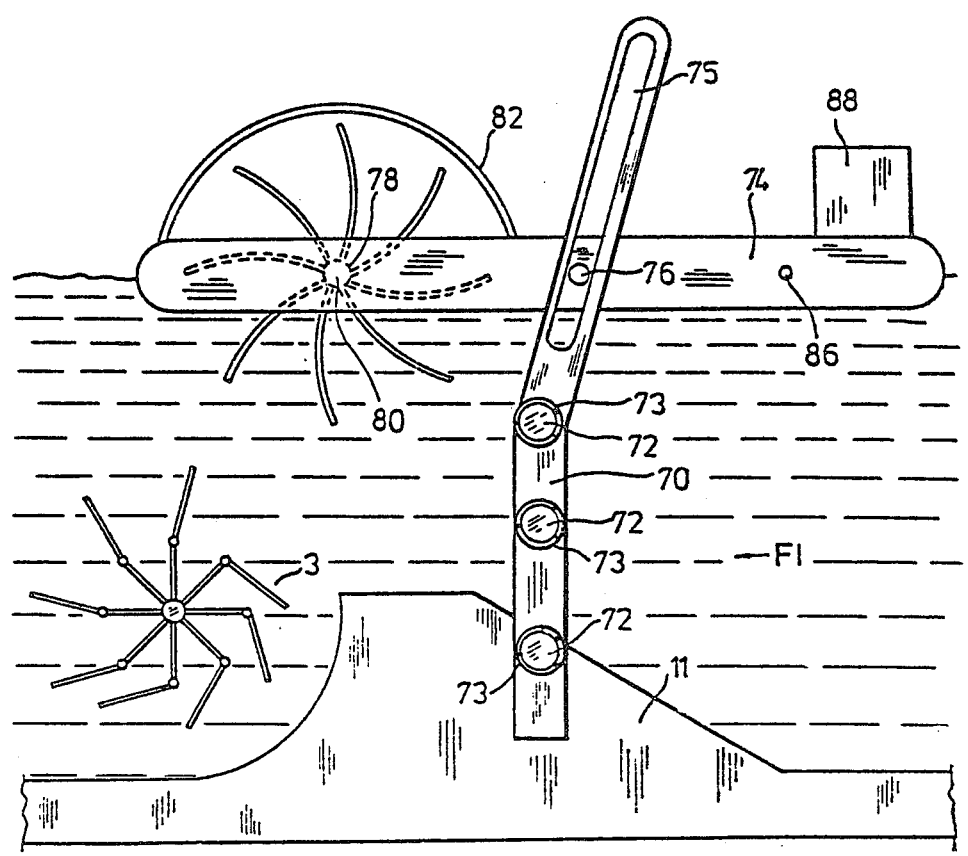
Figure 9:
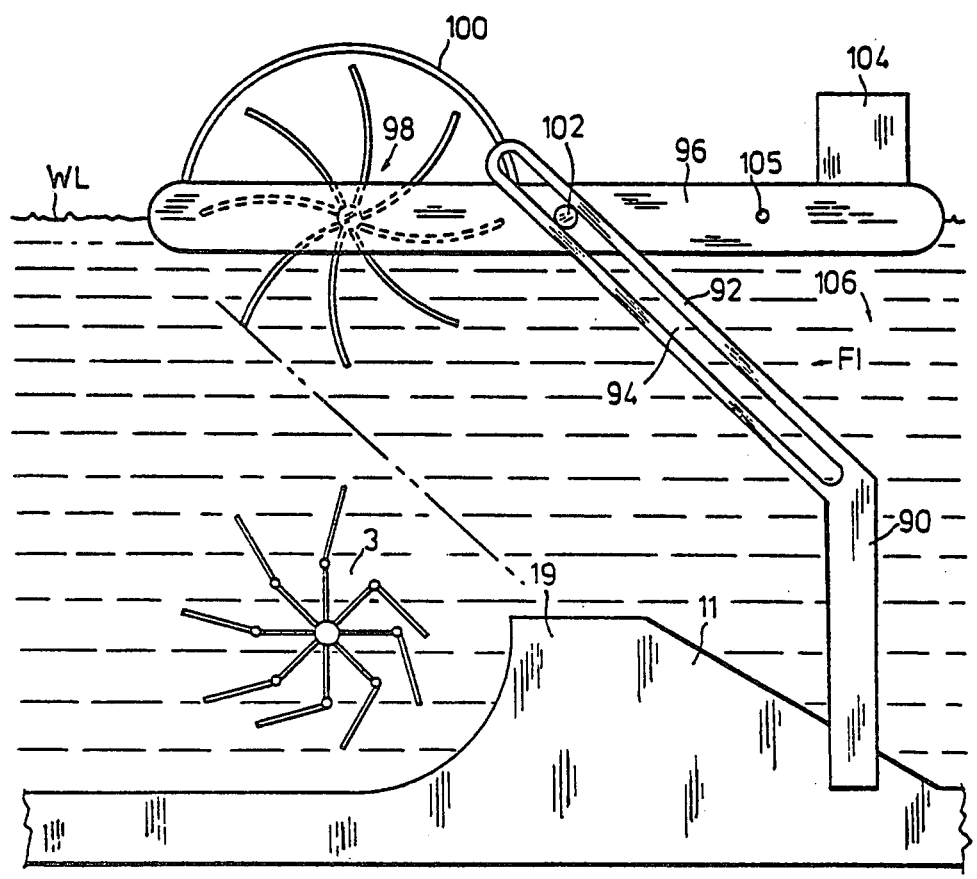

The combination of the submersible turbine device and a supplementary turbine device are shown in FIGS. 6 through 11 wherein:

FIG. 6 is a side view of one preferred arrangement of the combination;

FIG. 7 is a side view of a second preferred arrangement of the combination;

FIG. 8 is a modified version of that shown in FIG. 7;

FIG. 9 is a side view of a third preferred arrangement of the combination; and

FIGS. 10 and 11 are top views showing the adaptations made to a flowing body of water to receive any one of the combinations shown in FIGS. 6 through 9.

Figure 12:
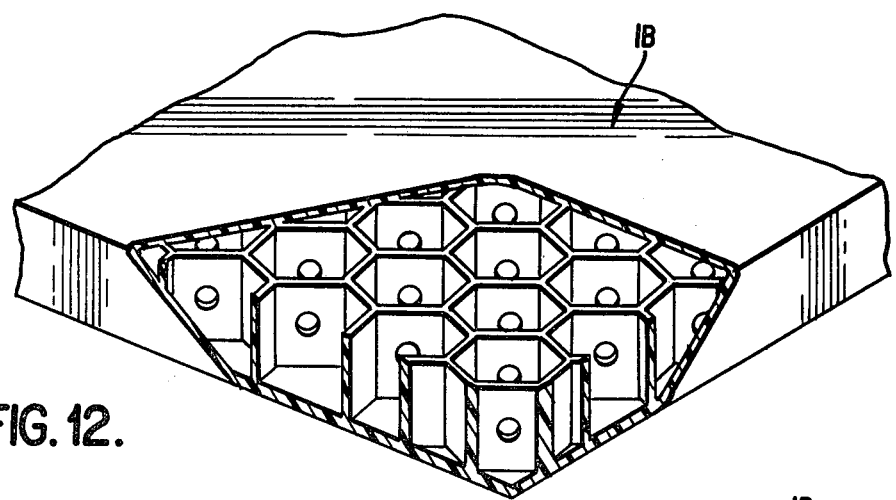

FIG. 12 is a top perspective view of a hollow turbine blade section in which a section has been broken off to show the inside structure of the blade.

Figure 13:
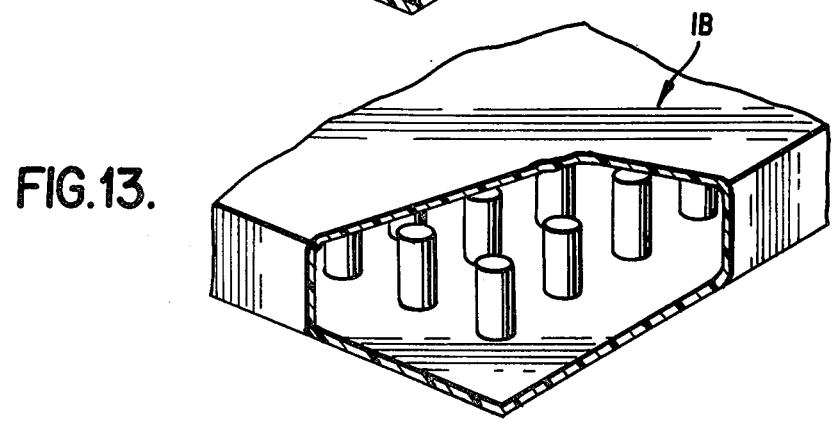

FIG. 13 is also a top perspective view of a hollow turbine blade section in which a section has been broken off to show the inside structure of the blade. However, FIG. 13 shows a different interior support structure than does FIG. 12.

DETAILED DESCRIPTION OF THE PREFERRED EMBODIMENTS OF THE INVENTION

For the purpose of the present description, the longitudinal dimension is parallel to the rotational axis of the turbine wheel and the transverse dimension is perpendicular to the rotational axis.

Figure 1:
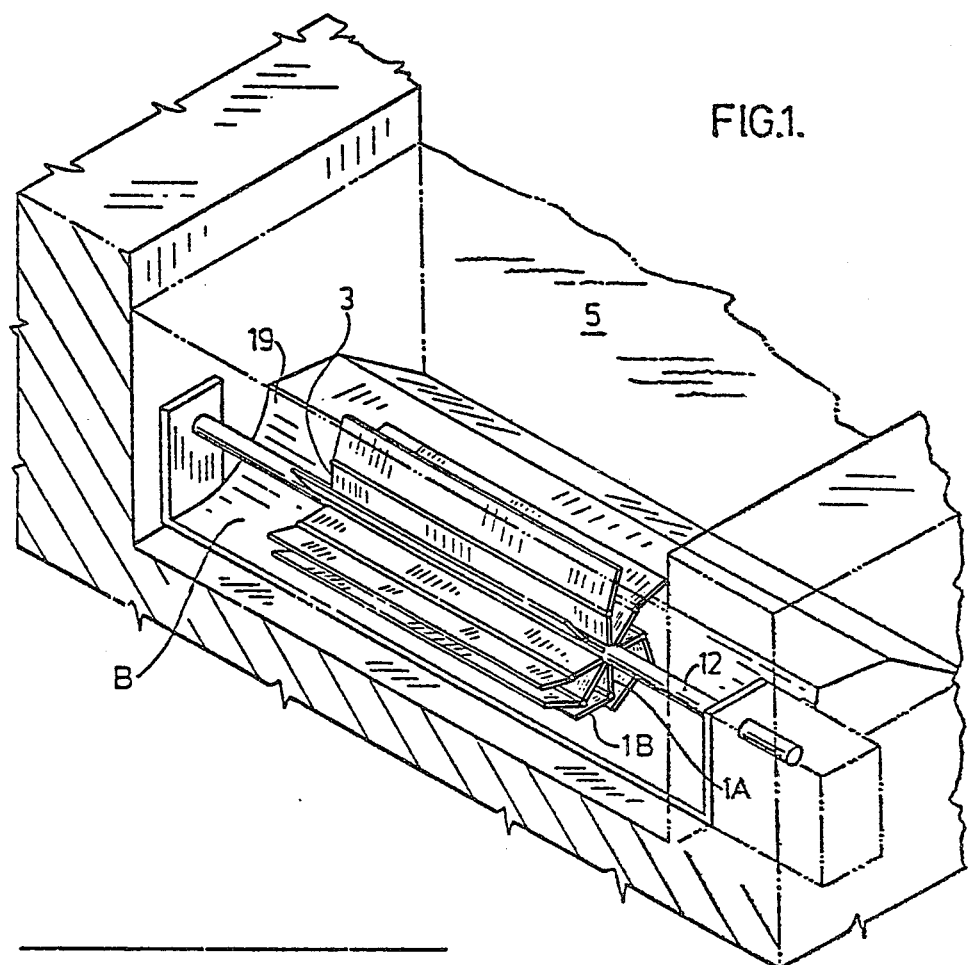
FIG. 1 is a perspective view of a preferred construction of the submersible turbine device according to the present invention.
Figure 2:
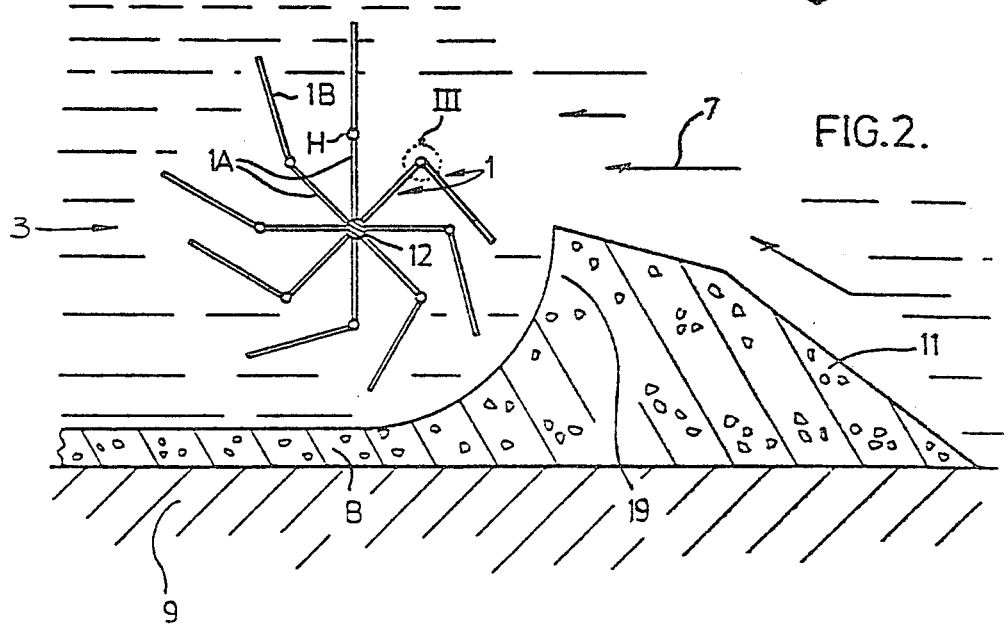
FIG. 2 is a cross-sectional view of the construction shown in FIG. 1, showing current flow against the forward or concave faces of the turbine blades with the back faces being convex.

Referring to FIGS. 1 and 2, the submersible turbine device includes a turbine bed B, and a turbine wheel 3 which is totally submersed in a low head flowing body of water 5, such as a river or a canal, with the current flowing in the direction of arrow 7. Turbine bed B is built on the riverbed 9 which provides the support for the turbine bed. The turbine bed is constructed of prefabricated or poured concrete or any other material which is suitably resistant to water erosion.

The turbine bed B arrangement is provided with a forward ramp 11 which introduces a venturi effect to the current flow. The ramp 11 is designed to accelerate and direct the current flow at the exposed upward blades of the turbine wheel 3, and is constructed to snugly accommodate the turbine wheel and to permit its rotation without interferring with the turbine blades. The combination of this snug fit and the forward ramp prevents excessive amounts of oncoming water from passing beneath the blades into the turbine bed. The turbine bed B is completely open at the rear to allow continual discharge of silt and debris downstream of the device, to prevent any buildup which would hinder the rotation of the turbine wheel 3.

The turbine wheel 3 comprises a central axle 12 and a plurality of blades 1. As can be seen in FIG. 1, axle 12 is journaled in the sides of the turbine bed so that the turbine wheel rotates about a horizontal axis positioned perpendicularly across the direction of current flow.

If the entire turbine wheel 3 were exposed to the current, its rotation would be hindered. However, this difficulty is overcome by the introduction of a forward shield 19 on the turbine bed 3 which is positioned to shield the downwardly extending blades from the oncoming current flow 7 and to guide the current flow, now with increased velocity against the upwardly extending blades. Therefore, as the turbine blades 1 are driven by the current of flowing water, the blades rotate continuously from an upwardly extending exposed to the current flow position to a downward shielded position. When in the downward shielded position, the blades are being passively returned to the upwardly extending position.

Figure 3:
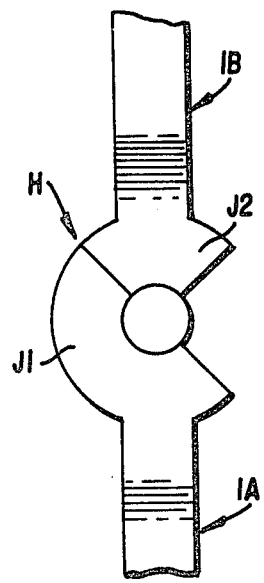
FIG. 3 is an enlargement of the area indicated at III, of FIG. 2 showing the blade sections in an extended position.

As will be appreciated from the description above, the main retarding force inhibiting rotary motion of the turbine wheel 3 is the water pressure on the back face of the turbine blades that are being forced upstream against the surrounding water pressure. Even though the forward ramp prevents direct flow on the turbine blades in the downward shielded positions, they still meet resistance from the water in the turbine bed. However, this frictional resistance is minimized as a result of the hinged blade arrangement of the present invention, one embodiment of which is shown in FIGS. 2 and 3. In these figures, each of the turbine blades are longitudinally transected into transverse sections 1A and 1B. The sections 1A and 1B are connected to each other by means of hinge H. The hinge comprises a conventional hinge and a jacket formed of portions J1 and J2, adapted to limit the angular movement of section 1B so that it extends as a moving arm from section 1A. As 1B rotates around hinge H in an arc, it forms an angle to 1A which may extend from approximately 90° to 180°. The rotational arc of section 1B about section 1A is preferably limited to approximately 90° or less.

The submersible turbine device of the present invention operates as follows. Current flowing downstream in the direction of arrow 7 is accelerated at the turbine wheel 3 by ramp 11, the forward shield of which is preferably located at approximately the mid point of the central axis 12 of wheel 3. The accelerated current flows over ramp 11 and is directed at the forward faces of the upwardly extending blades on the turbine wheel.

Figure 4:
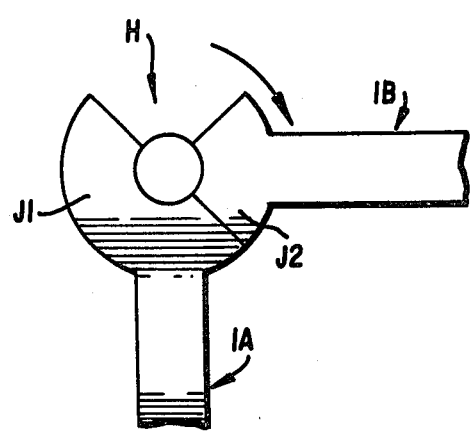
FIG. 4 is a view similar to FIG. 3, but showing the blade sections in a collapsed position.

The ramp 11 has a slight upward inclination to allow the water to strike the forward faces of the blades, i.e., the concave surfaces of the blade, and automatically forces section 1B to a fully extending position. As section 1B is in the folded position it may be maintained at greater than a 90° angle with respect to section 1A for automatic opening of the blade when subjected to current flow. When the blades are fully extended by the current flow, they present an increased surface area to the current flow which maximizes the driving force exerted by the current on the blades. It should also be noted that the hinge jacket maintains section 1B in a position such that the forward or concave face of the blade is fully exposed to current flow. Furthermore, the turbine blade is held in this extended position by the water pressure on its forward face only as long as it continues to move in the direction of the current flow. As the turbine blade starts to move upstream against water pressure, it automatically collapses to the maximum degree permitted by the hinge jackets, as shown in FIG. 4.

As the turbine blades automatically collapse against water pressure, there is a decrease of the effective transverse lengths, and hence a reduction in the effective surface areas of the downward, shielded turbine blades as they move through the water in the turbine bed. Reducing the effective surface area of the blade decreases water resistance to the rotation of the turbine wheel 3.

Figure 5:
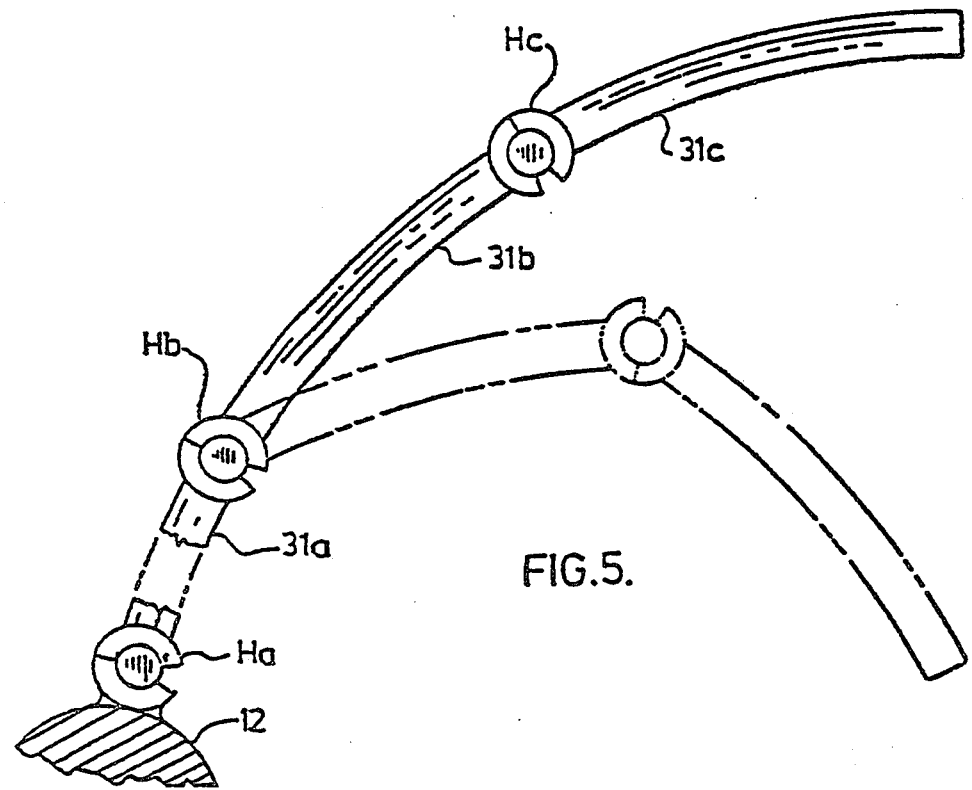
FIG. 5 shows an alternative turbine blade construction.

According to the embodiment described above, the interior blade section is fixedly secured to the central axle of the turbine wheel. FIG. 5 shows a turbine blade which operates in a slightly different manner and has a curved configuration as opposed to the straight blade section configuration shown in FIGS. 1 through 4.

The curved blade of FIG. 5 consists of a plurality of blade sections 31a, 31b and 31c. Not only are all of these sections hinged to one another by hinges Hb and Hc, but in addition, the interior section 31a is connected by means of the hinge Ha to the central axle 12 of the turbine wheel 3.

The blade sections may be made from any suitable material. The outer blade sections 1B are preferably made of light weight material and/or constructed as hermetically sealed hollow blades, trapping air within the interior confines of the blade sections to provide for greater buoyancy (FIGS. 12 and 13).

The turbine wheel 3, provided with a plurality of turbine blades as shown in FIG. 5, again functions much more efficiently than a conventional turbine wheel. It is used in conjunction with a similar shield ramp and rearwardly open turbine bed 11 to that shown in FIGS. 1 and 2 so that as the current flows downstream, it is accelerated up over the ramp onto the forward faces of an upwardly extending turbine blade to automatically extend the blade. The lower or downwardly extending turbine blades are shielded from direct current flow 7 by the forward shield 19 of the turbine blade. As the turbine wheel is forced to rotate by the driving force of the current flow, back faces of the turbine blades encounter resistance from the pressure of the surrounding water in the turbine bed which automatically collapses the blade sections at their respective hinges. However, in addition to the earlier embodiment, the turbine blades as shown in FIG. 5, also fold and extend at hinges Ha, between the interior section 31a and the central wheel axle, thereby reducing water friction on the back faces of the turbine blades to minimize resistance to wheel rotation and increasing the driving force on forward faces of the blades. Hinge Ha is also jacketed as are the other blades to restrict the arc that it will swing through. The automatic folding or collapsing of the turbine blades is enhanced by any added buoyancy to the outer blade section as described. However, as the turbine blades reach a location where they are being passively rotated upwardly, their buoyancy assists in the automatic opening or extending of the turbine blades so that they move to a position in which the water being directed upwardly by the forward ramp will strike the forward concave faces of the blades. Therefore, according to the embodiment, the turbine blades fold directly at the central axle. In addition, when they are buoyant, they automatically extend partly due to their buoyancy and finally as a result of a current flow on the forward faces to maximize the drive for wheel rotation. The buoyant feature enhances automatic folding and extending of the turbine blades and their sections.

The turbine blade of FIG. 5 may be hinged only directly at the central axle. This one hinge still provides for the automatic folding and opening of the blade for both minimizing resistance in the passive position and for maximizing drive when in the operative position.

The submerged turbine wheel 3, as shown and described, is oriented such that it rotates about a horizontal axis. It will be appreciated that the submerged turbine wheel will also operate effectively when rotated about a vertical axis with the turbine bed and forward shield appropriately positioned to that which has been described.

Referring to FIG. 6, the submerged portion of the combination includes a turbine wheel 3, a shield 19 and a ramp 11, all of which have been described above. The supplemental portion of the combination includes a pair of upright pillars 41, (both of which can be seen in FIG. 10) and a buoyant platform 45 which floats at the water level, indicated as WL. The platform includes a pair of mounting wheels 47 secured within rail trenches 43 on the upright pillars which permit the buoyant platform to rise and fall with the water level.

Platform 45 is provided with horizontal rail trenches 53 in which the wheel joints 50 connected to the axle of rotatable water wheel 49 are rotatably mounted. The rotatable water wheel 49, which has rigid turbine blades 52, is covered from above by means of a mobile dome-shaped housing 51, the interior of which may be heated, preferably electrically, to prevent any water from freezing around the water wheel 49.

Also provided on the platform is an electrical power generator 61 which is driven by coupling to the axle of water wheel 49 and its power is also capable of driving a push-pull rods 63 which is arranged to automatically pull water wheel 49 forwardly, toward pillar 43 as to the platform drops with the water level and which automatically pushes the floating wheel rearwardly away from the pillar with increases in both the water level and the height of the floating platform above the submerged turbine device. The water wheel 49 and its cover 51 move simultaneously as a unit.

Both the submerged wheel 3 as well as the floating wheel 39 are rotated by the current flows F1 in the body of water to which both are common. More particularly, the submerged wheel is rotated by current flow beneath the surface of the water, while the floating water wheel is rotated by current flow at and near the water level.

It is important that the floating wheel does not come into contact with the submerged turbine device. As will be seen in FIG. 6, when the water level is at a relatively high level, floating wheel 49 is maintained out of contact with wheel 3 by vertical separation. However, if the water level were to decrease, in which case platform 45 would drop with the water level in vertical trenches 43, and if wheel 49 were to take a straight downward drop path, it would come into contact with the submerged wheel. Such contact is avoided by means of generator 61 which through the push-pull rods 63, automatically pulls wheel joints 50 forwardly along horizontal rail trenches 53 toward pillars 41. This sliding action of the wheel joints in the horizontal trenches shifts the floating water wheel away from the submerged turbine device to avoid any contact between the blades on the two rotating bodies. Such sliding action of the wheel joints may also be accomplished via a small computer device.

As the water level increases to drive platform mounts 47 upwardly in vertical rail trenches 43, generator 61 automatically operates push-pull rods 63 to force wheel 49 via wheel joints 50 rearwardly in the horizontal rail trenches 53 away from pillars 41, back to the position shown in FIG. 6.

A further feature of the supplementary turbine device is shown in FIG. 6 wherein the center of gravity of the platform as indicated at 65 will lie forward to pillar 41 as the water level decreases. According to this feature, and due to the pivotal securing of the buoyant platform in the upright pillars, when the surface of the water reaches an excessively low level where mounts 47 come into contact with the lower end of vertical rail trenches 43, the entire platform pivots under the weight of generator 61 in the direction of arrow 54 such that wheel 49 is moved upwardly away from the submerged components toward upright pillars 41. The pivoting fulcrum also permits general fore and aft rocking movement of the floating platform.

The arrangement shown in FIGS. 7 and 8 includes a supplemental turbine device which operates differently from that described with respect to FIG. 6. Here, the horizontal shifting of the upper turbine wheel away from the submerged wheel is accomplished through a hinged, rather than a sliding action.

The combination of FIGS. 7 and 8 again, includes a submerged turbine wheel 3, forward shield 19, and ramp 11. However, the supplemental device itself, comprises a pair of supporting pillars 70, one on either side of a floating or buoyant platform 74 (see FIG. 11). The platform is pivotally secured to the pillars as shown at 76. Provided on the buoyant platform are a water wheel 78 having a rotatable axle 80 anchored to the platform and a heat-enclosing cover 82.

The upright pillars comprise vertical sections 71 which are connected by a plurality of hinges 72. The upright pillars are adapted to permit platform 74 to rise and fall with increases and decreases in the water level of the flowing body. These hinges which include hinge jackets 73 similar to those described with respect to the submerged wheel, are collapsible in one direction only, i.e., in the direction of arrow 84, such that platform 74 carrying water wheel 78 shifts forward and downwardly in an arc-shaped path away from turbine wheel 3 with decreases in the water level WL. As the water level increases, the platform automatically rises due to its buoyancy. As the platform rises, it extends the pillar sections back to the vertical upright position. However, the hinges which are, as mentioned above, collapsible only in the direction of arrow 84, will not permit the pillars to go beyond the vertical position and as such, there is no risk of wheel 78 falling downwardly into wheel 3 with decreases in water level. In FIG. 8, the upper portion of pillars 70 are provided with vertical slots 75 which provide a safety measure to permit increased rising of the platform in the event of excessively high water levels. In the event of excessively low water levels, the platform is again set up such that its center of gravity 86 lies on the opposite side of the pillars from wheel 3 whereby platform 74 would pivot under the weight of generator 88 about hinges 72 and carry wheel 78 upwardly, away from wheel 3.

Still another form of the supplemental turbine device is shown in FIG. 9. This device again cooperates with a submerged wheel 3 blocked by a forward shield 19 and a ramp 11.

The supplemental arrangement itself, comprises a pair of upwardly extending support pillars 90 having angled or curved support portions 92 provided with oblique rail trenches 94. A buoyant platform 96 is secured in the oblique trenches of the angled support portions by pivotal mounts 102. Water wheel 98 is rotatably mounted in buoyant platform 96 and is covered from above by an electrically heated enclosure 100. Generator 104 is provided at the opposite end of the platform from wheel 98 such that the center of gravity of the platform lies in the vicinity of the area indicated at 105.

With this arrangement, as is the case with the above arrangements, the floating water wheel supported in the platform which floats at water level WL, is always maintained out of contact with submerged wheel 3 regardless of the water level. Accordingly, with decreases in water level from that shown in FIG. 9, the platform not only falls with the water level but is shifted horizontally away from the submerged wheel by the guiding action of oblique trenches 94. It will be clearly seen in FIG. 9 that the path followed by water wheel 98 with decreases in water level, avoids contact with and remains at a prescribed distance from the submerged wheel. As the water level increases, the platform rises with the water level and is at the same time, guided on a diagonal path by trenches 94 such that water wheel 98 resumes the position shown in FIG. 9, directly above submerged wheel 3.

This arrangement also includes the safety feature of a pivotal connection between the platform and the upwardly extending support pillars whereby in the event of excessively low water levels in which mounts 102 rest on the bottom of trenches 94, the platform will pivot in the direction of arrow 106 under the weight of generator 104.

A number of highly desirable features are provided as a result of any of the arrangements shown in FIGS. 6 through 9. First, the water wheel is enclosed on all sides by the platform which provides a bulwark against any foreign matter, such as logs and the like, floating down the river at water level from coming into contact with the water wheel. Secondly, because the generators are, in all instances, mounted directly on the platform, there is a constant connection between the generators and the water wheels supplying power to the generators. In other words, the generator is maintained at a fixed distance from the water wheel regardless of water level changes because the generator is mounted directly on the platform. Thirdly, they provide a venturi flow approaching that in a closed channel, and augment the power output by increasing the flow velocity.

When the supplemental devices as shown in FIGS. 6 through 9 are used in a flowing body such as a river or the like, they may cover part or the entire width of the river. In the latter instance, it would restrict the flow of surface traffic along the river. FIGS. 10 and 11 show adaptations which can be made to the river to prevent this problem.

According to the arrangement shown in FIG. 10, floating platform 45 and its supporting pillars 41 essentially block the entire width of a flowing body indicated at FB thereby making maximum use of the current flows in the body. However, in order to permit traffic around the structure a canal C is provided with access to the canal through a sliding door SD. This sliding door is normally closed as indicated in FIG. 10 to maximize the current flow past the floating platform and its rotating wheel and is only open in the event of traffic desiring to travel up or down the flowing body.

According to the arrangement shown in FIG. 11, platform 74 and its supporting pillar 70 once again, cover a large portion of the width of the flowing body FB. Should there be traffic around the floating platform a bypass BP is provided in the riverwall and is normally closed by means of a pivotal gate 10. Again, the pivotal gate is only opened in the event of traffic and is closed at all other times, to maximize the current flow to drive the water wheel supported in the floating platform.

As will be understood from the description above, the supplementary turbine device operates in conjunction with the submerged device to capture much of the current flowing along the flowing body of water. The energy outputs of the two devices can be channelled to one area as an extremely effective power source as they operate with each other synergistically by using the venturi principle.

What is claimed is:

1. A submersible turbine device and a supplementary turbine device comprising:
    a turbine bed;
    a turbine wheel mounted in close relation to said turbine bed, said turbine wheel comprising a central axle and a plurality of turbine blades, said turbine blades each comprising a plurality of sections which extend outwardly from said axle;
    hinge means connecting said turbine blade sections which limit the angle that one turbine blade section can be rotated relative to the other turbine blade section to between substantially 180° and 90° through a rotational arc of substantially 90° or less, said hinge means being activated by water pressure, said turbine blades being fully extended when exposed to and traveling in the same direction as the water current flow, said turbine blades being folded when moving in a direction opposite to the water current flow;
    said turbine bed being contoured to snugly accommodate and permit rotation of said turbine wheel and being provided with a forward shield position to allow current flow on said turbine blades when said turbine blades are in an upwardly extending position and to prevent current flow on said turbine blades when said turbine blades are in a downward position;
    said supplementary turbine device comprising:
        an anchored upwardly extending support means;
        a buoyant platform mounted to said support means for floating at water level, said support means being adapted to permit automatic vertical travel of said buoyant platform with changes in the water level; and
        a water wheel rotatably mounted in said buoyant platform located substantially above said turbine wheel;
        said buoyant platform and said support means cooperating with one another to coordinate horizontal shifting of said water wheel to the vertical movement of said buoyant platform, said water wheel shifting away from and being maintained out of contact with said submersible turbine device during changes in the water level.

2. A submersible turbine device and a supplementary turbine device as in claim 1, further comprising:
   a mobile heated cover on said platform housing to prevent freezing of water around said water wheel.

3. A submersible turbine device and a supplementary turbine device as in claim 1, wherein:
   said upwardly extending support means comprises at least one upright pillar provided with a vertical rail trench in which said buoyant platform is mounted for automatic vertical travel with changes in the water level;
   said platform being provided with horizontal rail trenches in which said water wheel is rotatably as well as pivotally mounted;
   means for horizontally shifting said water wheel in said horizontal trenches as said platform travels vertically with changes in the water level.

4. A submersible turbine device and a supplementary turbine device as claimed in claim 1, including a power generator coupled to the shaft of the water wheel for power generation, and for horizontally shifting said water wheel in said platform as said platform travels vertically with changes in the water level.

5. A submersible turbine device and a supplementary turbine device as claimed in claim 1, wherein said buoyant platform is pivotally mounted to said pillars in said vertical rail trenches and said platform is weighted to pivot said water wheel upwardly towards said pillar and away from said submersible turbine device if excessive decreases in the water level occur.

6. A submersible turbine device and a supplementary turbine device as claimed in claim 1, wherein said upright support means comprises at least one upright pillar with said platform being mounted to said pillar;
   said pillar being comprised of vertical sections which are hinged to one another in order to permit automatic and controlled lowering of said platform and horizontal shifting of said water wheel away from said submersible turbine device with decreases in the water level and to permit automatic raising of said platform and horizontal shifting of said water wheel towards said submersible turbine device with increases in the water level.

7. A submersible turbine device and a supplementary turbine device of claim 1, wherein said support means comprises, a pair of upright supporting pillars, each of which is provided with vertical sections which are connected by at least one hinge adapted to permit bending of the pillars from a vertical upright position in a controlled direction downwardly and horizontally away from said submersible turbine device as the water level decreases, and to return to a vertical upright position as the water level increases.

8. A submersible turbine device and a secondary turbine device as claimed in claim 1, wherein said upwardly extending support means comprises a pair of supporting upright pillars having upwardly angled portions provided with oblique rail trenches, said buoyant platform being adjustably secured in said oblique rail trenches such that said buoyant platform and said water wheel move in a tangential relation with said submerged turbine device with the changes in the water level while keeping a predetermined distance away from it.

* * * * *